March 13, 1945.　　M. SOUDERS, JR., ET AL　　2,371,477
CATALYTIC CONVERSION APPARATUS
Filed Oct. 6, 1941　　2 Sheets-Sheet 1
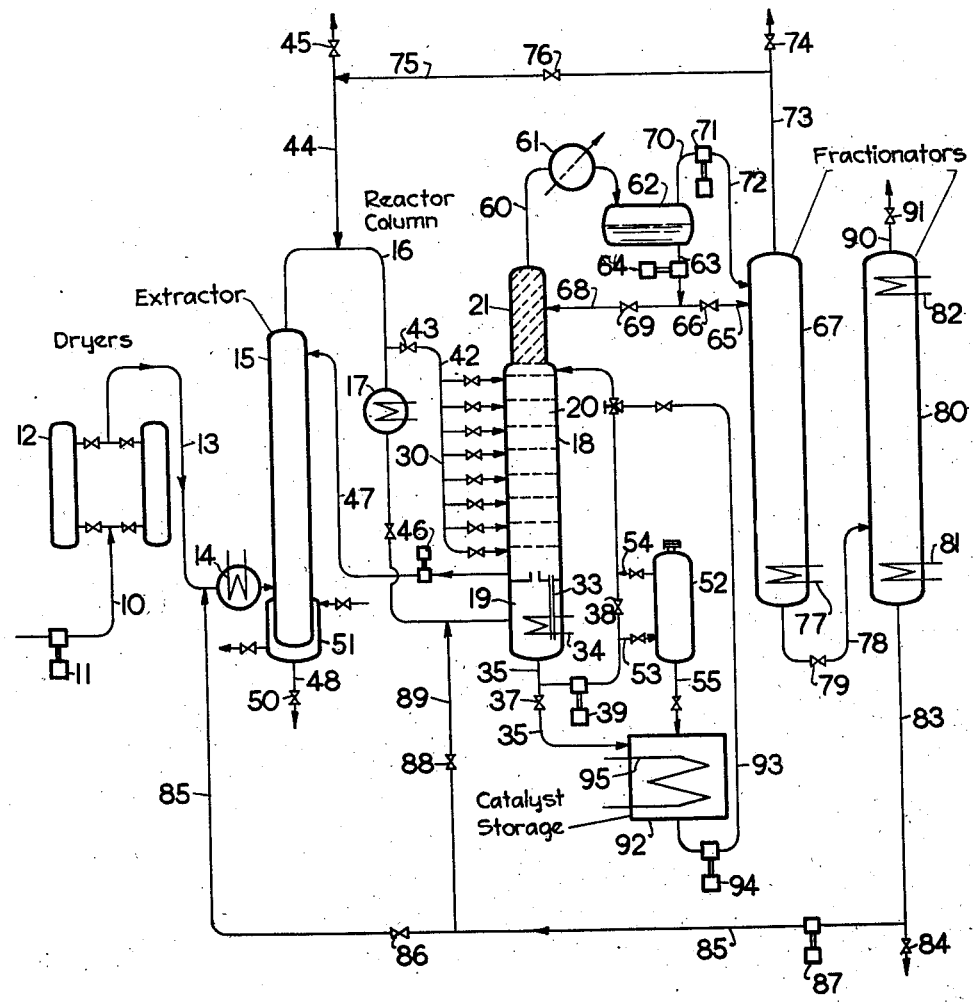
Fig. I
Inventors: Mott Souders Jr.
Alexander J. Cherniavsky
By their Attorney: H. Birch March 13, 1945.  M. SOUDERS, JR., ET AL  2,371,477
CATALYTIC CONVERSION APPARATUS
Filed Oct. 6, 1941   2 Sheets-Sheet 2
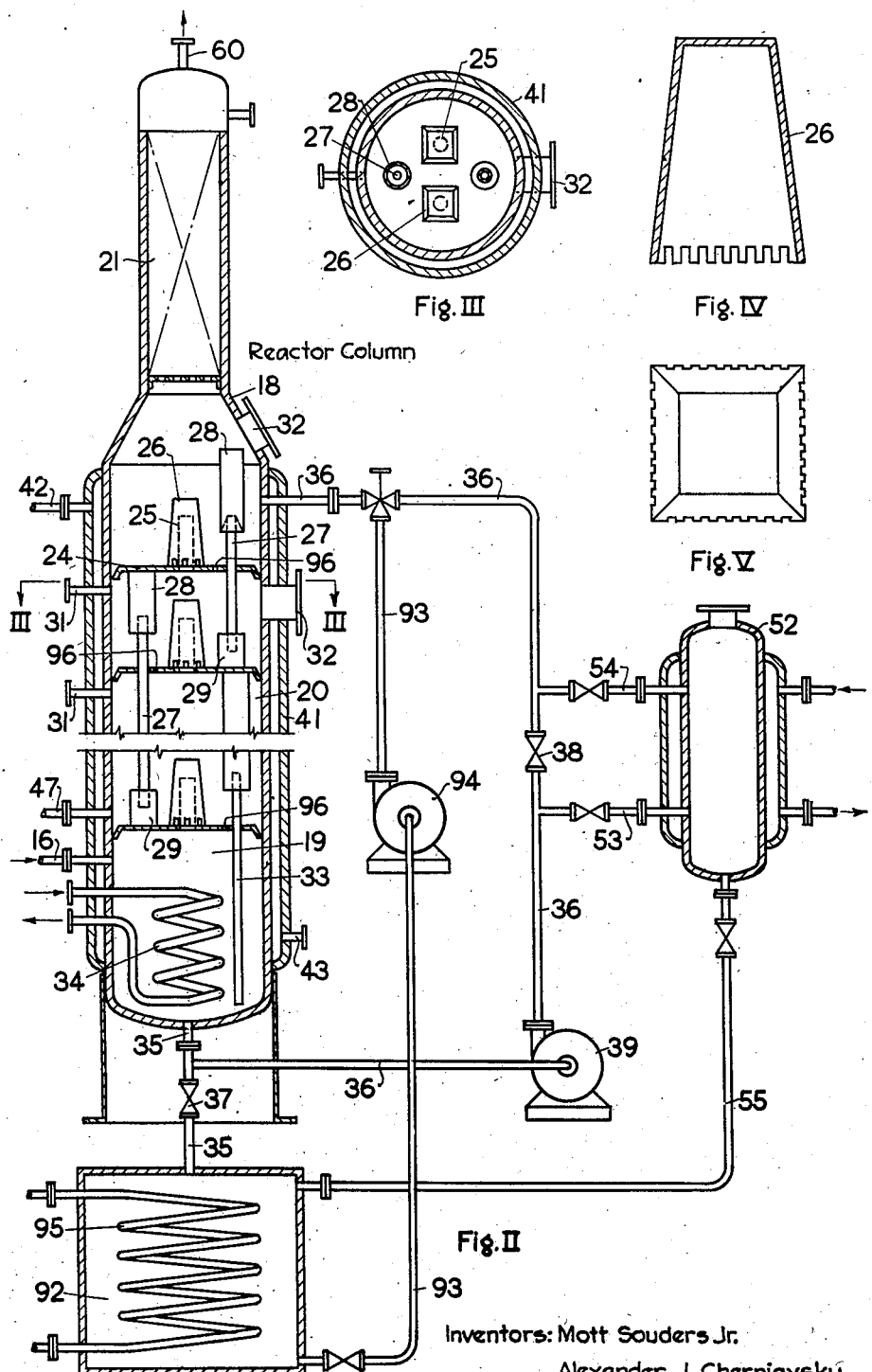
Fig. III
Fig. IV
Fig. V
Fig. II
Inventors: Mott Souders Jr.
Alexander J. Cherniavsky
By their Attorney: H. Birch Patented Mar. 13, 1945

2,371,477

UNITED STATES PATENT OFFICE 2,371,477

CATALYTIC CONVERSION APPARATUS

Mott Souders, Jr., Berkeley, and Alexander J. Cherniavsky, San Francisco, Calif., assignors to Shell Development Company, San Francisco, Calif., a corporation of Delaware Application October 6, 1941, Serial No. 413,822

5 Claims. (Cl. 23—260)

The present invention relates to improved apparatus for effecting catalytic conversions in the vapor phase with fluid catalysts. More specifically, the present invention relates to apparatus suitable for use in the execution of catalytic conversions with catalysts of the molten salt type, such as molten salt mixtures comprising metal salts of the Friedel-Crafts type.

In the majority of processes involving catalytic conversions, the catalyst is employed in a solid state in the form of fragments, pellets, or the like. The use of solid catalysts is quite satisfactory in many cases, but has certain disadvantages such as the difficulty of moving solid catalysts in the reaction zone, poor heat transfer conditions, difficulty of properly contacting catalyst and reactants, the need for large volumes of catalysts, etc., which seriously detract from its suitability, particularly when employing halide catalysts. These disadvantages can often be diminished or eliminated by employing the catalyst in the liquid state. This is accomplished in any one of several ways, depending upon the particular catalyst. A common method is to employ the catalyst in the molten state.

It is often impractical, if not impossible, to employ the active catalyst per se in the molten state and a multicomponent catalyst containing one or more modifying agents must therefore be used. Thus, for example, in the case of molten salt catalysts, a plurality of salts are generally combined. By the use of suitable combinations of salts, fusible mixtures which have excellent activity and may be melted to free-flowing liquids at relatively low temperatures may be prepared. Thus, for example, Friedel-Crafts type catalysts, such in particular as aluminum chloride, are only fusible in their pure state at relatively high temperatures, and at such temperatures they act primarily to cause degradation and sludge formation. On the other hand, if their salts are combined with other salts such as the halides of Li, Na, K, Cu, Mg, Zn, Cd, Sn, Pb, As, Sb, Bi, Cr, Mo, Fe, Co, and Ni, excellent multicomponent catalysts which may be used in the form of mobile liquids at temperatures even below 100° C. may be produced. In certain processes, such as isomerization and alkylation of hydrocarbons, a low melting point of the catalyst is important since the reaction equilibrium becomes progressively less favorable as the reaction temperature is increased, and it is therefore desirable to effect the conversion at relatively low temperatures.

The melting point of these multicomponent catalysts is dependent upon their composition. In general, the composition is quite critical and if the catalyst is allowed to deviate from the desired composition the melting point is considerably increased. In the usual operation of processes with such catalysts by prior known method, it is therefore necessary to operate at a temperature sufficiently above the solidification point of the catalyst to allow for any changes in melting point due to changes in catalyst composition during the process. Changes in the solidification points of the catalysts caused by variations of catalyst compositions are not only detrimental in requiring the use of somewhat higher reaction temperatures, but in their effect upon the degree of efficiency with which the catalysts and reactants may be contacted. In all such processes, the efficiency of contact of the reactants and the catalyst is of prime importance since it directly affects the conversion and production capacity. When such low-melting multicomponent catalysts change appreciably in composition during use, the viscosity of the melt increases, and this usually causes a considerable falling-off of the conversion or production capacity.

These various molten catalysts, although highly desirable in many respects, present certain disadvantages when used in the hitherto proposed processes, which have prevented their widespread use. One of these disadvantages has been the excessive cost and difficulty of recovering the catalyst after it is partly or completely spent. This is due to the fact that it is rarely practical to discard the spent catalyst and that the recovery of the valuable components therefrom usually requires withdrawing the molten mixture to a separate recovery unit wherein carbonaceous material is burned out or otherwise separated by mechanical or other means. In most cases it is necessary to follow this operation by a distillation of the catalyst components from the non-volatile material in the catalyst. Aluminum chloride-containing catalysts for example, when spent, will comprise non-volatile alumina formed by the degradation of aluminum chloride. This requires a separate treatment, usually under vacuum. In the hitherto proposed processes using catalysts of this type, these disadvantages have been greatly aggravated when treating hydrocarbons or other organic materials with catalysts of the Friedel-Crafts type due to the fact that these catalysts are particularly prone to form sludges. The sludges, which are presumably complex compounds comprising side reaction products and Friedel-Crafts halides, quickly become viscous and sticky. Since their accumulation in the reaction zone to any substantial extent causes mechanical difficulties such as pumping problems, line plugging, etc., it has been necessary to withdraw the catalyst from the system long before it is completely spent and subject it to the regeneration treatment.

An object of the present invention is to provide improved apparatus whereby vapor phase conversions with these fluid catalysts can be effected in a more practical and economical manner, while substantially obviating inherent difficulties encountered in the prior art apparatus. Another object of the instant invention is to provide apparatus whereby the fluid catalyst may be continuously regenerated. A further objetc is to provide apparatus particularly suitable for the vapor phase isomerization of saturated hydrocarbons. A still further object of the invention is to provide appaartus whereby the fluid catalysts may be regenerated using the saturated feed hydrocarbons as the purifying agent.

It has been observed that the sludges formed in such fluid catalyst conversion processes as those outlined above, notwithstanding the fact that they contain carbonaceous matter, are substantially insoluble in the reactant feed and are, in fact, considerably more insoluble than many of the salt components of the catalysts. It has also been observed that in multicomponent catalysts, even though the solubilities of the individual components may be small, they are not equal and as a result an appreciable change in catalyst composition will be caused by extraction of the more soluble component or components by liquid reactants. For example, in the case of molten catalysts comprising an excess of $AlCl_3$ dissolved in $LiCl$, $NaCl$ $KCl$, etc., $AlCl_3$ will be extracted selectively from the mixture and, in the case of molten catalysts comprising $AlCl_3$ dissolved in $SbCl_3$, $SnCl_4$, $BiCl_3$, $AsCl_3$, etc., these latter salts are removed at a much faster rate than the $AlCl_3$.

The difficulties heretofore encountered in recovering the spent catalysts are avoided according to the process of the present invention by continuously subjecting a portion of the catalyst to a continuous treatment within the system whereby valuable components of the catalyst are separated from the sludge by an extraction process and continuously returned to the reaction zone. In accordance with the present invention, spent or partly spent catalyst is continuously withdrawn from the reaction zone and extracted with liquid feed to the system whereby at least the more soluble catalyst components are extracted therefrom. The feed comprising recovered catalyst components is heated to effect the separation of material to be treated as a vapor fraction from a liquid fraction comprising the recovered catalyst components, and the resulting vapor and liquid fractions are passed to the reaction zone in separate streams under conditions providing for the maintenance of substantially constant catalyst composition within the reaction zone.

The invention is applicable to a wide variety of catalytic processes wherein materials are contacted in the vapor phase with fluid catalysts of the molten salt type. However, for the purpose of setting forth more clearly the invention, it will be described in detail herein in its application to a specific hydrocarbon conversion, namely, the isomerization of saturated hydrocarbons. The following detailed description of the invention is made with reference to the attached drawings, forming part of this specification, wherein Figure I shows a more or less diagrammatical elevational section of the improved apparatus according to the invention;

Figure II shows in detail a cross-section in elevation of the reactor column and certain auxiliary equipment shown in Figure I;

Figure III is a horizontal section of the reactor tower taken through III—III of Figure II;

Figure IV shows a cross-section in side elevation of a bubble cap of the reactor tower; and Figure V is a plan view of the bubble cap shown in Figure IV.

Identical parts of apparatus are indicated by like reference characters in the various figures of the drawings.

Referring to Figure I of the drawings, a saturated hydrocarbon, for example butane, from any suitable source is forced by means of pump 11 through line 10 into a drying zone. The drying zone may consist of one or more chambers 12 containing a suitable dehydrating material such as, for example, calcium chloride, adsorptive alumina, or the like. From dryer 12, the dried butane stream is passed through line 13 provided with preheater 14 to an intermediate part of an extraction zone. The extraction zone may suitably consist of a column 15, provided with suitable packing material, baffles, or the like. Within extraction zone 15, butane is contacted with spent or partly spent catalyst as described more fully below. Liquid butane, containing recovered catalyst components, is passed from extraction column 15 through line 16 and heater 17 to a vaporizing zone.

In a preferred embodiment of the invention, the vaporizing zone, a reaction zone and a rectifying zone are comprised in a single combination reactor tower 18. Referring to Figure II, the reactor tower 18 comprises a vaporizer 19 in the lower part thereof, a bubble plate reactor 20 in the intermediate part thereof, and a rectifier 21 in the upper part thereof. A plurality of bubble decks 24 equipped with bubble units are provided within reactor 20. A relatively deep pool of liquid catalyst is maintained upon each bubble deck. A bubble unit of a design permitting the maintenance of a high liquid level upon each deck is therefore provided. A suitable bubble unit having a high vapor riser 25 and means such as a slotted cap 26 for the efficient dispersion of vapors into the catalyst pool is shown in Figures IV and V. Downspouts 27 are provided for the overflow of catalyst from each bubble deck. Although but two bubble units are shown on each deck in the drawing (Figure II), it is to be understood that a greater number of bubble units, in accordance with the size of the reactor employed, may suitably be used. The overflow lip of the downspouts is provided with baffles such as pipes 28 of larger cross-sectional area than the downspouts. Since the efficient dispersion of the reactants into the catalyst of a type such as molten salts often results in the formation of a foamy mass which occupies a substantial part of the space above the liquid level of the catalyst pool, baffles 28 extend to the bottom of the bubble deck above or are closed in some other manner at their upper end. Similarly, baffles 29 of larger cross-sectional area than the outlets of downspouts 27 may be provided about the outlets of the downspouts. These baffles 29 will extend from the floor of the bubble deck for a distance well above the outlet end of the downspout to prevent the diversion through the downspout of vapors dispersing from the bubble unit. Means such as inlets 31 are provided for the introduction of cooling fluid above each bubble deck. Manholes 32 permit access into reactor 20 at each bubble deck.

Vaporizer 19 is separated from reactor 20 by the lowest bubble deck of reactor 20. A downspout 33 extends from the lowest bubble deck well into the vaporizer 19 to permit the continuous overflow of catalyst from reactor 20 into vaporizer 19. Evaporator 19 functions as a catalyst accumulator and a supply of fluid catalyst is maintained therein. A heating coil 34 is positioned in evaporator 19 to permit the maintenance of the catalyst at the desired reaction temperature and to vaporize hydrocarbons which may be introduced therein in the liquid phase. Lines 35 and 36, equipped with valves 37 and 38, respectively, and pump 39 are provided for the continuous passage of liquid catalyst from evaporator 19 to the upper part of reactor 20. A continuous flow of liquid catalyst is thus maintained from evaporator 19 to reactor 20 and downwardly through reactor 20 back into vaporizer 19. Rectifier 21, in vapor communication with reactor 20, is preferably packed with suitable tower packing material. A jacket 41 with inlet 42 and outlet 43 is provided about reactor 20 and vaporizer 19. A suitable heating medium such as steam, hot oil, etc., is passed through jacket 41 to aid in maintaining the desired temperature conditions within evaporator 19 and reactor 20.

The above-described reactor containing the molten catalyst in a plurality of spaced pools provides a most efficient means of contacting vaporized reactants and the molten catalyst. In their upward travel through the reactor, the reactants are redispersed in each successive pool of catalyst in the form of small bubbles. It is to be noted that the size of the bubbles of dispersed reactants is substantially constant throughout the reaction zone, thereby avoiding the decrease in effective contact occasioned by an increase in size of the individual bubbles in their upward travel through the catalyst. It is seen that vaporizer 19 of column 18 is utilized to heat the catalyst to reaction temperature, to aid in vaporizing the charge to the reactor, and to separate the recovered catalyst components from the charge. The combination of all of these functions within a single reactor tower 18 minimizes the difficulties heretofore encountered in maintaining a molten mass of catalyst within a well defined temperature range of optimum operating conditions, provides for maximum concentration, and therefore maximum conservation, of heat within the system, and obviates the difficulties and loss of catalyst entailed in the handling of substantial flows of molten catalysts through a plurality of separate units of apparatus. These features of the process lead to a substantial increase in the degree of efficiency and ease of operation with which vapor phase reactions can be effected with the aid of fluid catalysts of the molten salt type.

A wide variety of suitable isomerization catalysts comprising highly active molten salt catalyst mixtures may suitably be used. A very suitable catalyst may comprise, for example, a molten mixture of antimony chloride and aluminum chloride in the approximate proportions of 76 to 97 mol per cent $SbCl_3$ and 24 to 3 mol per cent $AlCl_3$.

Referring again to Figure I, within vaporizer 19 butane vapors are separated from extracted catalyst components. The vapors pass from vaporizer 19 upwardly through the consecutive pools of fluid aluminum chloride-antimony chloride melt within reactor 20, whereby isomerization of butane is effected. The temperature to be maintained within reactor 20 and vaporizer 19 may range from the minimum temperature at which the catalyst may be maintained in the fluid state up to approximately 200° C. A particularly effective temperature may comprise, for example, a temperature in the range of from about 60° C. to about 120° C., depending upon the particular catalyst employed. The reaction temperature is maintained by the heat input in heater 17 and heating coil 34. The pressure to be maintained within reactor column 18 may be varied as desired depending upon the materials being used in order to permit operation in the vapor phase and at the temperatures preferred. Maintenance of pressures in the range of from 25 to 500 lbs. gauge, preferably 75 to 125 lbs., within reactor 20 have been found to be suitable. To assist in maintaining the desired temperature within reactor 20, a part of the liquid butane stream emanating from extractor 15 may be bypassed through line 42, provided with valve 43, and through manifold 30 to any one or several points along the length of reactor 20.

The isomerization, when employing catalysts of the above type, is preferably effected in the presence of a hydrogen halide such as hydrogen chloride. This is preferably introduced with the hydrocarbon feed. Hydrogen chloride is therefore drawn from any outside source through line 44, provided with valve 45, leading into line 16. The amount of hydrogen chloride introduced into the system may vary widely in accordance with the nature of the charge, the catalyst composition, and operating conditions. In such cases where it is not desired to recover and recycle the hydrogen halide, minimum quantities, such as from about 0.3% to 5%, of the hydrocarbon feed may be employed. When the hydrogen chloride is recycled, however, much larger quantities, for instance up to 25%, of the butane charge may be economically employed. If desired, a limited amount of hydrogen may be introduced with the hydrogen chloride to repress cracking or other undesirable side reactions.

The exceptional suitability of the tower type reactor for the isomerization of butane in the vapor phase with an $SbCl_3$-$AlCl_3$ catalyst melt is shown by the folowing example:

Normal butane was isomerized in the vapor phase with a catalyst melt consisting of 92.5% of $SbCl_3$ and 7.5% $AlCl_3$ at a temperature of 80° C. and a pressure of approximately 90 lbs. gauge, in a tower type reactor. The normal butane charge was passed into the reactor at a rate of 0.95 to 1 liter per hour per liter of catalyst space for a period of 24 hours. Hydrogen chloride was added to the feed in the amount 4.5% by weight of normal butane treated. An average conversion of butane to isobutane of 46% was obtained. The production rate was 0.450 kg. of isobutane per hour per liter of catalyst space.

It is seen from the above figures that excellent and sustained yields may be obtained with relatively short periods of contact and without recourse to recycling of normal butane.

Spent or partly spent catalyst comprising sludge is withdrawn from the lower part of reactor 20 and forced by means of pump 46 through line 47 into the upper part of column 15, wherein it is contacted with an upward flow of liquid hydrocarbon feed. The rate at which catalyst is withdrawn from reactor 20 and passed to column 15 will vary with operating conditions. Thus, the catalyst may be caused to move downwardly through reactor 20 at such a rate that it will be substantially spent when it reaches the lower part thereof. In such case, catalyst will be passed therefrom to column 15 at a sufficiently rapid rate to substantially avoid the passage of catalyst from reactor 20 directly into vaporizer 19 through line 33. When maintaining a more rapid flow of catalyst through reactor 20, and a flow of catalyst from reactor 20 directly into vaporizer 19 through line 33, it is preferred to effect the passage of partly spent catalyst from reactor 20 to column 15 at a rate sufficiently high to prevent the accumulation of sludge within reactor column 18. During the downward course of the spent or partly spent catalyst through column 15, at least a substantial part of the more soluble salt components contained therein is dissolved in the hydrocarbon feed. The sludge, comprising organic complexes of the Friedel-Crafts catalysts, which is contained in the spent catalyst is substantially insoluble in the hydrocarbon feed which contributed to its formation and accumulates in the lower part of column 15, whence it is withdrawn. The hydrocarbon charge to the system is preferably preheated to a temperature favorable to the extraction operation. This temperature will vary with the nature of the material being treated and the particular catalyst used. In the present illustrative description of the invention in its application to the isomerization of butane, the butane charge is preferably heated to a suitably elevated temperature, for example in the approximate range of 50° C. to 125° C. and preferably 50° C. to 100° C. The $SbCl_3$-$AlCl_3$ catalyst of the above-described range of composition is found to possess an appreciable degree of solubility in normal butane in this temperature range. Thus, at 80° C. the solubility of this catalyst in normal butane is found to be in the order of about 7.2% to 7.5% by weight, and the dissolved catalyst material comprises approximately 97% to 99.5% of $SbCl_3$, the remainder of the dissolved material being $AlCl_3$. The sludge, comprising organic aluminum chloride complex compounds present in the spent or partly spent catalyst, is substantially insoluble in the butane and settles to the lower part of column 15, whence it is withdrawn through line 48, controlled by valve 50, and eliminated from the system. The lower part of column 15 is provided with heating means such as, for example, a heating jacket 51 provided with inlet and outlet means for a heating medium such as steam or hot oil to maintain the spent catalyst residue in the fluid state. By careful control of conditions within column 15, substantially all of the $SbCl_3$ may be extracted from the spent catalyst by the incoming butane feed in a substantially pure state and conveyed in the butane stream through line 16 into vaporizing zone 19. The efficiency of the catalyst recovery step of the invention is illustrated by the following examples:

101.5 grams of spent catalyst obtained in the isomerization of butane with a catalyst melt consisting of 92.5% of $SbCl_3$ and 7.5% of $AlCl_3$ was extracted with 5 portions of normal butane totaling 2.14 kg., at a temperature of 80° C. 83.1 grams of sludge-free catalyst components, 99% of which was $SbCl_3$, were extracted from the spent catalyst.

624 grams of spent catalyst obtained in the isomerization of butane with a catalyst melt consisting of 92.5% of $SbCl_3$ and 7.5% of $AlCl_3$ were extracted at a temperature of 80° C. with 15.5 kg. of normal butane in a continuous operation. The butane was charged to the extractor at the rate of 1000 grams per hour. 604 grams of sludge-free catalyst components were extracted from the spent catalyst, more than 99% of which was found to be $SbCl_3$. The residue consisted essentially of carbonaceous complex compounds and contained only approximately 0.4 gram of antimony.

It is to be noted from these examples that the catalyst components are recovered free of sludge and that the carbon content of the spent catalyst is found in the residual material. It is seen therefrom that but very little of the $AlCl_3$-hydrocarbon complex in the spent catalyst, which renders the use of molten salt catalysts so difficult in the processes used heretofore, remains within the system in the process of the invention. This continuous removal of the $AlCl_3$-hydrocarbon complex from the system not only assures a substantial increase in catalyst life and maintenance of high catalyst activity, but greatly facilitates the handling of the molten catalyst within the system.

Since the catalytic activity and minimum temperature at which the $SbCl_3$-$AlCl_3$ catalyst can be maintained in the fluid state depend upon the catalyst composition, and since $SbCl_3$ is the predominating component of the catalyst, its continuous substantially complete recovery and return to the reaction zone greatly facilitates the maintenance of optimum reaction conditions. Antimony chloride, furthermore, is a relatively costly material and therefore the practical and efficient method for its recovery within the system greatly contributes to the lower cost at which isomerization may be effected by the present process when utilizing a catalyst melt comprising this compound.

At least a part of the heat required to effect the vaporization of the butane feed may be provided by heater 17 and the vaporization completed within vaporizer 19. The recovered antimony chloride is thus separated from the vaporized feed within vaporizer 19 and combined with the catalyst accumulated therein. It is to be noted that the removal of the recovered antimony chloride from the charge before the latter enters the reactor 20 avoids the change in catalyst composition which would occur within reactor 20 by the introduction and consequent accumulation of this component in the lower part thereof. By thus effecting the separation of the recovered antimony chloride within vaporizer 19 of the combination reactor column 18, the disadvantages such as catalyst loss, need for a separate flow of recovered antimony chloride to the reaction zone, increased heat requirements, etc., which are inherent in the use of a separate unit of apparatus for this phase of the process, are avoided.

Sufficient catalyst flowing through line 36 is periodically by-passed through a drum 52 containing aluminum chloride, by means of valved lines 53 and 54 to replace the aluminum chloride used up during the process in the formation of sludge. The fluid catalyst may be drained from the system through valved lines 35 and 55 and passed to suitable catalyst storage means 92, an insulated vessel including a heating coil 95 therein being satisfactory for this purpose. A small hole, as at 96, is provided in each bubble deck. This hole is not large enough to have any appreciable effect upon the circulating liquid catalyst, but serves to completely drain the bubble deck when operation of the apparatus is stopped.

From storage vessel the fluid catalyst, in heated condition, may be forced through line 93 to threeway valve 96 in line 36 by means of pump 94 and thus returned to the reactor tower 18.

Although antimony chloride has but a slight vapor pressure at the reaction temperature, some will nevertheless tend to pass along with the reaction products leaving reactor 20. In order to prevent the loss of this material and avoid the difficulties which result from its presence in the remainder of the system, rectifier 21 packed with suitable packing material is positioned above reactor 20. Sufficient liquid reflux is introduced into the upper part of the rectifier to carry any entrained antimony chloride back to the reactor in solution. Reatcion products comprising isobutane, normal butane, and hydrogen chloride pass from rectifier 21 through line 60 and cooler 61 into accumulator 62. In passing through cooler 61, the reaction products are cooled to a temperature sufficiently low to effect the condensation of butanes. Although but a single cooler is shown in the drawings, more than one cooling system and, if desired, a refrigerator system may be used to effect the desired cooling of the reaction products. Liquid is drawn from accumulator 62 through line 63 and forced by means of pump 64 through line 65, provided with valve 66, to a stripping column 67. Part of the liquid drawn from accumulator 62 is forced through line 66 provided with valve 69 as reflux, to the top of rectifier 21. Cooling means not shown in the drawings may be provided to further cool the reflux passing to rectifier 21. Vapors and gases comprising hydrogen chloride are drawn from accumulator 62 through line 70, to compressor 71. From the high pressure side of compressor 71, the compressed stream is passed through line 72 into stripping column 67. Within stripping column 67, a gaseous fraction comprising hydrogen chloride is separated from a liquid fraction comprising isobutane and and unreacted butane. A high pressure, for example in excess of about 300 lbs., is maintained within column 67 to effect the desired separation. The gaseous fraction comprising hydrogen chloride is eliminated from the top of column 67 through line 73 provided with valve 74, and is recycled at least in part through line 75 provided with valve 76, to line 44. Suitable means such as, for example, a reboiler or heating coil 77 is provided in the bottom of column 67 to effect the desired separation. Liquid comprising isobutane and unreacted butane is withdrawn from the bottom of column 67 and passed through line 78 provided with valve 79, into a fractionator 80. Fractionator 80 is provided with suitable heating means such as, for example, a reboiler or a heating coil 81 in the bottom part thereof, and suitable cooling means such as, for example, a cooling coil 82 in the upper part thereof. Within fractionator 80 a vapor fraction comprising isobutane is separated from a liquid fraction comprising normal butane. Liquid comprising normal butane is withdrawn from fractionator 80 through line 83 provided with valve 84, and eliminated from the system. A part or all of the butane drawn from fractionator 80 through line 83 may be forced through line 85, provided with valve 86, by means of pump 87, into line 13. At least a part of the normal butane thus recycled through line 85 may, by careful control of valves 86 and 88, be passed through line 89 into line 16, leading into vaporizer 19.

Vapors comprising isobutane are withdrawn overhead from fractionator 80 through line 90, provided with valve 91, as a final product, and passed to conventional condensing and recovery means.

Though not shown in the drawings, extractor 15, reactor tower 18 and all lines and drums through which molten catalyst is passed are insulated with suitable insulating means to prevent the loss of heat therefrom by radiation.

The hydrocarbon or mixture of hydrocarbons to be isomerized is preferably substantially free of materials which are particularly prone to undergo side reactions such as degradation, polymerization, etc., under the reaction conditions. If desired, excessive quantities of olefines, diolefines, or other detrimental impurities which may be present in the hydrocarbon or hydrocarbon mixture to be treated may be removed by a suitable pretreatment such as by a mineral acid refining, hydrogenation, or the like. However, an important advantage of the process of the invention resides in the fact that column 15 functions as a charge pretreating zone wherein impurities such as unsaturated hydrocarbons are converted in the presence of the spent or partly spent catalyst to materials which are readily eliminated from the system with the sludge withdrawn through line 48. Thus, when butane containing 0.6% by weight of butylene was used as the charge to the extractor wherein spent $SbCl_3-AlCl_3$ catalyst was being extracted, the butane leaving the extractor was found to contain only 0.004% by weight of olefine, indicating that a practically complete removal of the olefine had been effected.

The process of the invention is in no wise limited to the isomerization of hydrocarbons, but is applicable to a wide variety of processes wherein materials are treated in the vapor phase with fluid catalysts comprising normally solid materials or liquids which are higher-boiling than the material being treated. Thus, the process of the invention is particularly applicable to the execution of such processes as alkylation, cracking, polymerization, reforming, desulfurizing, oxidation of hydrochloric acid, treating, etc., of hydrocarbons or other materials wherein such materials are contacted in the vapor phase with liquid catalysts.

We claim as our invention:

1. In a system for effecting vapor phase reactions in the presence of liquid catalysts, the combination comprising an extractor, a reactor chamber, a fractionating means, a conduit extending between the lower portion of said fractionating means and the lower portion of said extractor for supplying liquid to the lower portion of said extractor, a conduit including heating means extending between the lower portion of the reactor chamber and the upper portion of the extractor for supplying liquid catalyst and vapor to the lower portion of said reactor chamber, a conduit including cooling means extending between the top portion of said reactor chamber and the lower portion of said fractionating means for supplying condensed overhead product from said reactor chamber to said fractionating means, a conduit extending between the lower portion of said reactor chamber and the upper portion of said extractor for supplying liquid catalyst from said reactor chamber to said extractor, a conduit extending from the lower portion of said reactor chamber to the upper portion thereof, means for circulating liquid catalyst through said last named conduit from the lower portion of said reactor chamber to the upper portion thereof and conduit means in flow communication with the lower portion of said extractor for supplying liquid feed material to said extractor.

2. The system according to claim 1 including an auxiliary catalyst chamber, a bypass conduit extending between the lower portion of said auxiliary catalyst chamber and the conduit extending between the lower and upper portions of the reactor chamber, a bypass conduit extending between the upper portion of said auxiliary catalyst chamber and the conduit extending between the lower and upper portions of the reactor chamber and means for controlling the flow of liquid catalyst through the bypass conduits and the auxiliary catalyst chamber.

3. The system according to claim 1 wherein the liquid-vapor contact system in the reactor chamber comprises at least two superimposed decks spaced apart and rigidly mounted in a chamber, a vapor riser in each of said decks, bubble caps positioned over each of said vapor risers, a first liquid overflow pipe extending through the lower of said two decks and terminating at its upper end in a position above the level of said lower deck, a second liquid overflow pipe extending through the upper of said two decks and terminating at its lower end below the upper end of said first overflow pipe, baffle means circumposing a portion of the upper end of said first overflow pipe and baffle means circumposing a portion of the lower end of said second overflow pipe.

4. In a system for effecting vapor phase reactions in the presence of liquid catalysts, the combination comprising an extractor, a reactor chamber, heating means disposed in the lower portion of said reactor chamber, an auxiliary catalyst chamber, a catalyst storage chamber, a fractionator, conduit means in flow communication with the lower portion of said extractor for supplying liquid feed material to said extractor, conduit means between the upper section of said extractor and the lower section of said reactor chamber, conduit means including cooling means between the upper section of said reactor chamber and said fractionator, conduit means between the lower section of said reactor chamber and the top of said extractor whereby liquid catalyst may be passed in countercurrent flow to the liquid passing through said extractor, liquid eduction means disposed near the bottom of said extractor, conduit means between said lower section of said reactor chamber and said catalyst storage chamber, conduit means between the lower section of said auxiliary catalyst chamber and said catalyst storage chamber, conduit means between said catalyst storage chamber and said upper section of said reactor chamber, conduit means between said lower section of said reactor chamber and said upper section of said reactor chamber whereby liquid catalyst may be circulated in countercurrent flow to the vapor passing through said reaction chamber and bypass conduit means between said last named conduit means and said auxiliary catalyst chamber whereby liquid catalyst may be circulated therethrough.

5. A system according to claim 4 wherein the reactor chamber comprises a plurality of superimposed decks spaced apart and rigidly mounted in said chamber in an intermediate section thereof, a vapor riser in each of said decks, bubble caps positioned over said vapor risers, a liquid overflow pipe extending through each of said decks, the upper ends of said overflow pipes terminating in positions above the respective decks through which they pass and the lower ends of said overflow pipes terminating in positions below the upper ends of the liquid overflow pipes of the next lower deck, baffle means mounted on the upper side of each deck and circumposing a section of the lower end of the overflow pipe extending below the next deck above, and baffle means mounted on the lower side of each deck and circumposing a section of the upper end of the overflow pipe extending above the next deck below.

MOTT SOUDERS, Jr.
ALEXANDER J. CHERNIAVSKY.